US012757245B2

(12) United States Patent
Verschueren et al.

(10) Patent No.: US 12,757,245 B2
(45) Date of Patent: Oct. 6, 2026

(54) PERIPHERAL DEVICE DIRECTED COLLISION AVOIDANCE

(71) Applicant: NXP B.V., Eindhoven (NL)

(72) Inventors: Pieter Verschueren, Langdorp (BE); Steven Mark Thoen, Blanden (BE)

(73) Assignee: NXP B.V., Eindhoven (NL)

( * ) Notice: Subject to any disclaimer, the term of this patent is extended or adjusted under 35 U.S.C. 154(b) by 383 days.

(21) Appl. No.: 18/455,867

(22) Filed: Aug. 25, 2023

(65) Prior Publication Data

US 2025/0071807 A1 Feb. 27, 2025

(51) Int. Cl.
*H04W 74/04* (2009.01)
*H04W 12/61* (2021.01)

(52) U.S. Cl.
CPC ........... *H04W 74/04* (2013.01); *H04W 12/61* (2021.01)

(58) Field of Classification Search
CPC ......... H04W 72/1268; H04W 74/0833; H04W 74/0841; H04W 74/0866; H04W 74/08; H04W 72/12; H04W 60/00; H04W 76/18; H04W 68/005; H04W 8/24; H04W 84/042; H04W 92/24; H04W 68/00; H04W 12/61; H04W 4/80; H04W 74/04; H04W 72/0446; H04W 72/569; H04W 84/18; H04L 1/1887; H04L 1/1867
See application file for complete search history.

(56) References Cited

U.S. PATENT DOCUMENTS 5,862,452 A * 1/1999 Cudak ................. H04W 74/004 455/352
11,800,499 B1 * 10/2023 Assao ............... H04W 72/0446
12,395,864 B2 * 8/2025 Elsherif ................ H04W 24/10
2016/0050686 A1 * 2/2016 Krishnamoorthi .... H04W 28/04 455/418
2016/0337971 A1 * 11/2016 Bhargava .......... H04W 52/0216
2017/0367036 A1 * 12/2017 Chen ...................... H04W 48/16
2017/0367110 A1 * 12/2017 Li ...................... H04W 72/1268
2018/0084558 A1 * 3/2018 Chen ...................... H04W 12/06
2018/0110046 A1 * 4/2018 Patil .................. H04W 72/0446
2018/0176820 A1 * 6/2018 DenBoer ............... H04W 72/56
2019/0387382 A1 * 12/2019 Wojcieszak ............. H04W 4/80
2020/0077426 A1 * 3/2020 Tie ......................... H04L 5/0048
(Continued)

FOREIGN PATENT DOCUMENTS

JP 2007511985 A 5/2007
WO 2022252917 A1 12/2022

OTHER PUBLICATIONS

Schill, Felix et al.; "Pruning Local Schedules for Efficient Swarm Communication"; https://ieeexplore.ieee.org/document/4231111; 2007 Symposium on Underwater Technology and Workshop on Scientific Use of Submarine Cables and Related Technologies; Apr. 2007; 7 pages.

(Continued)

*Primary Examiner* — Nathan S Taylor

(57) ABSTRACT

One example discloses a peripheral device, including: a radio receiver configured to, receive a first set of audio packets transmitted over a first wireless link from a first central device, and receive a second set of audio packets transmitted over a second wireless link by the second central device; and a processor configured to predict a collision between the first set of audio packets and the second set of audio packets based on a set of transmission scheduling parameters.

14 Claims, 6 Drawing Sheets

(56) References Cited

U.S. PATENT DOCUMENTS

| | | | | |
|---|---|---|---|---|
| 2020/0092730 | A1* | 3/2020 | Thubert | H04W 16/14 |
| 2020/0107399 | A1* | 4/2020 | Pu | H04W 72/56 |
| 2020/0146066 | A1* | 5/2020 | Nguyen | H04W 72/12 |
| 2022/0272512 | A1* | 8/2022 | Gu | H04W 72/0446 |
| 2022/0312551 | A1* | 9/2022 | Pu | H04W 72/56 |
| 2023/0064205 | A1* | 3/2023 | Sirur | H04R 5/033 |
| 2023/0106965 | A1* | 4/2023 | Haartsen | G06F 3/162<br>455/41.3 |
| 2023/0252899 | A1* | 8/2023 | Kanda | G08G 1/0141<br>701/2 |
| 2023/0401115 | A1* | 12/2023 | Lee | H04L 49/60 |
| 2024/0049116 | A1* | 2/2024 | Choi | H04W 8/005 |
| 2024/0107503 | A1* | 3/2024 | Lee | G06F 3/165 |
| 2024/0140489 | A1* | 5/2024 | Min | B60W 50/029 |
| 2024/0273829 | A1* | 8/2024 | Stockhammer | H04L 67/04 |
| 2024/0396849 | A1* | 11/2024 | Lee | H04L 12/40 |
| 2025/0031191 | A1* | 1/2025 | Xu | H04R 3/00 |
| 2025/0106905 | A1* | 3/2025 | Hirsch | H04W 24/02 |
| 2025/0203598 | A1* | 6/2025 | Goyal | H04W 72/0446 |
| 2025/0240839 | A1* | 7/2025 | Ryu | H04W 76/14 |

OTHER PUBLICATIONS

RF Wireless World; "Piconet vs Scatternet—Difference between Piconet and Scatternet"; Retrieved from internet https://www.rfwireless-world.com/Terminology/difference-between-piconet-and-scatternet-in-bluetooth.html on Aug. 21, 2023; No date on article listed; 4 pages.

* cited by examiner

600

| 602 ISO INTERVAL PHONE LINK [ms] | 604 ISO INTERVAL GAMING LINK [ms] | 606 FLUSH TIMEOUT GAMING LINK | 608 TRANSPORT LATENCY [ms] | 610 COMMENT |
|---|---|---|---|---|
| – | 5 | 2 | 7.7 | ONLY GAMING LINK |
| 7.5 | 5 | 2 | 7.7 | |
| 10 | 7.5 | 2 | 10.7 | |
| 15 | 10 | 2 | 13.8 | OPTION 1 |
| 15 | 5 | 3 | 12.7 | OPTION 2 |
| 20 | 7.5 | 2 | 10.7 | |
| 22.5 | 5 | 2 | 7.7 | |
| 30 OR ABOVE | 5 | 2 | 7.7 | |

FIG. 6

PERIPHERAL DEVICE DIRECTED COLLISION AVOIDANCE

The present specification relates to systems, methods, apparatuses, devices, articles of manufacture and instructions for peripheral device directed collision avoidance.

SUMMARY

According to an example embodiment, a peripheral device, comprising: a radio receiver configured to, receive a first set of audio packets transmitted over a first wireless link from a first central device, and receive a second set of audio packets transmitted over a second wireless link by the second central device; and a processor configured to predict a collision between the first set of audio packets and the second set of audio packets based on a set of transmission scheduling parameters.

In another example embodiment, the first and second sets of audio packets are Bluetooth LE audio packets.

In another example embodiment, the first central device is configured to initially schedule when the first set of audio packets are transmitted over the first wireless link; and the second central device is configured to initially schedule when the second set of audio packets are transmitted over the second wireless link.

In another example embodiment, the set of transmission scheduling parameters includes a first set of transmission scheduling parameters received from the first central device and a second set of transmission scheduling parameters received from the second central device.

In another example embodiment, the processor is configured to request at least one of the first central device and the second central device to update one or both of the two sets of transmission scheduling parameters.

In another example embodiment, at least one of the first central device and the second central device is configured to update one or both of the sets of transmission scheduling parameters based on the request from the peripheral device.

In another example embodiment, at least one of the two sets of transmission scheduling parameters are a set of ISO parameters.

In another example embodiment, the ISO parameters include an ISO interval defining a time interval between audio packet transmissions.

In another example embodiment, the ISO parameters include a number of subevents scheduled within the ISO interval.

In another example embodiment, the ISO parameters include a flush timeout defining a maximum number of consecutive ISO intervals for transmitting a particular audio packet before the particular audio packet is discarded.

In another example embodiment, the processor is a priority encoder or a link controller.

In another example embodiment, the first wireless link is a gaming link and the second wireless link is a phone link.

In another example embodiment, the processor is configured to predict the collision based on the first and second sets of transmission scheduling parameters before the first set of audio packets are first transmitted by the first central device.

In another example embodiment, the processor is further configured to predict the collision before the second set of audio packets are first transmitted by the second central device.

In another example embodiment, the peripheral device is a headset.

In another example embodiment, the first central device is a dongle.

In another example embodiment, the second central device is a smartphone.

In another example embodiment, the peripheral device is at least one of a wireless earbud and/or a wireless speaker.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 6 represents example sets of transmission schedule parameters (e.g. ISO parameters) for the gaming link and/or the phone link.

Figure 1:
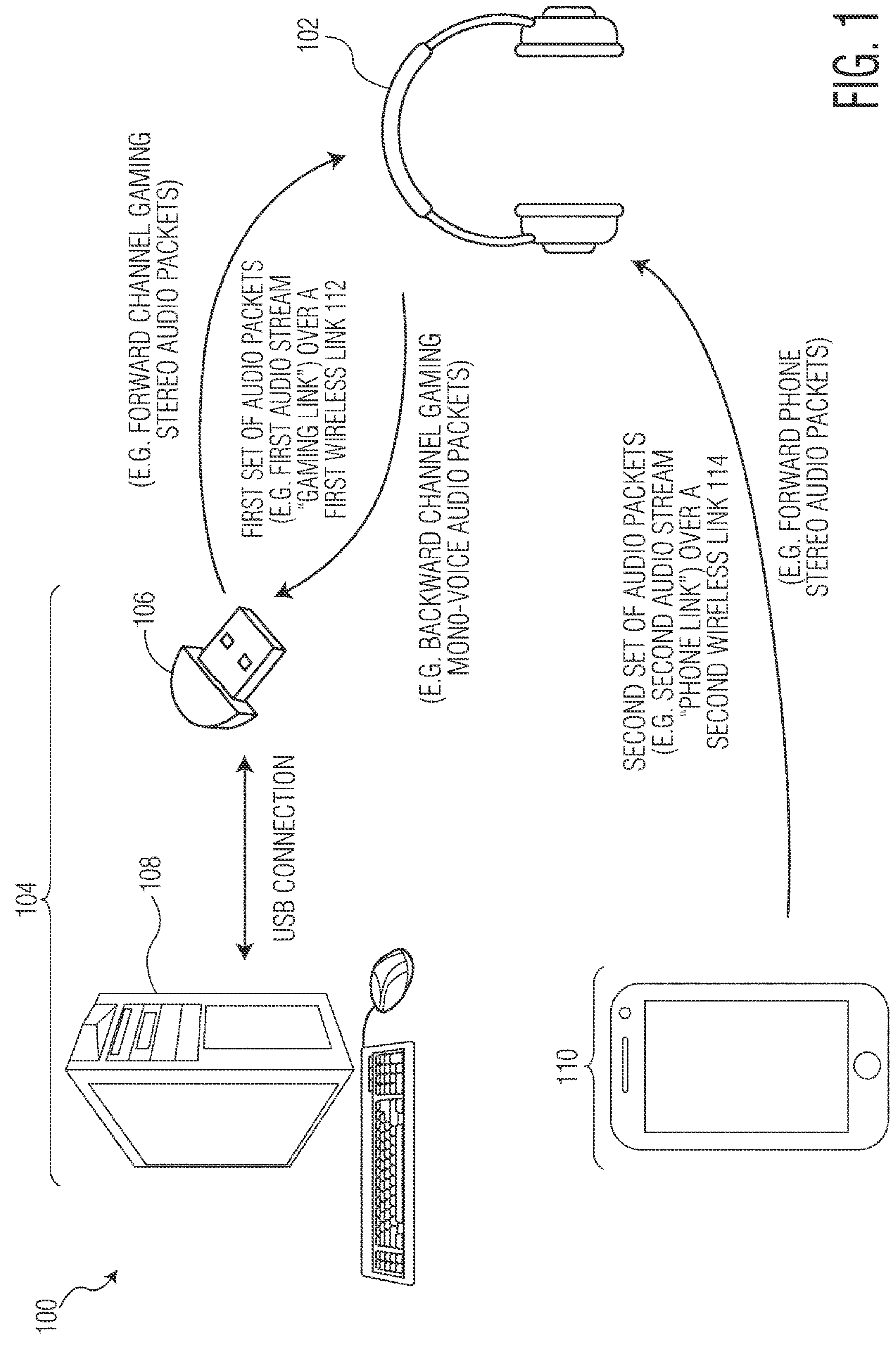
FIG. 1 represents an example of a peripheral device (e.g. headset) wirelessly coupled to a first central device (e.g. dongle) and a second central device (e.g. smartphone).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1 represents an example 100 of a peripheral device 102 (e.g. headset) wirelessly coupled to a first central device 104 (e.g. dongle) and a second central device 110 (e.g. smartphone).

The peripheral device 102 (a.k.a. acceptor) in some example embodiments is a gaming headset. The peripheral device 102 includes a variety of circuitry (not shown) including an antenna, a radio transceiver, a processor, a memory, and power source.

The first central device 104 (a.k.a. first initiator) in some example embodiments is a dongle 106 coupled to a personal computer 108. The first central device 104 includes a variety of circuitry (not shown) including an antenna, a radio transceiver, a processor, a memory, and power source.

The second central device 110 (a.k.a. second initiator) in some example embodiments is a smartphone. The second central device 110 includes a variety of circuitry (not shown) including an antenna, a radio transceiver, a processor, a memory, and power source.

The Bluetooth LE Audio standard may enable many new use cases which are not possible with Bluetooth Classic. While there may be no LE Audio profiles yet for gaming use cases, the flexibility of the LE Audio framework (link layer+host stack) allows new use cases beyond the standardized profiles. One such hypothetical use case is a gaming headset 102 use case with a parallel audio connection towards the phone using a single radio device in the headset 102.

A first set of audio packets (e.g. first audio stream gaming link) are exchanged between the peripheral device 102 and the first central device 104 over a first wireless link 112. These packets may include a forward channel gaming stereo audio packets and backward channel gaming mono-voice audio packets.

A second set of audio packets (e.g. second audio stream phone link) are exchanged between the peripheral device 102 and the second central device 110 over a second wireless link 114. These packets may include a forward phone stereo audio packet stream and an optional backwards voice stream.

The dongle 106 as the first central device 104 acts as a first initiator and the headset 102 as acceptor. The scheduling of the first set of audio packets (e.g. first audio stream "gaming link") over a first wireless link 112 (e.g. LE Audio packets) is determined by the dongle 106. An exact timing of these gaming link audio packets (a.k.a. subevents) depends on a crystal clock connected to the transceiver (e.g. LE Audio radio) in the dongle 106.

The smartphone as the second central device 110 acts as a second initiator, while the headset 102 is still the acceptor. The scheduling of the second set of audio packets (e.g. second audio stream "phone link") over a second wireless link 114 (e.g. LE Audio packets) is determined by the phone 110. An exact timing of these phone link audio packets (a.k.a. subevents) depends on a separate crystal clock connected to the transceiver in the phone 110.

Thus in some example embodiments there is simultaneous audio reception from both phone 110 and the dongle 106 at the headset 102. The two audio streams 112, 114 are mixed and played through the speakers, enabling a user to listen to music perhaps and hear game audio at a same time. For example, the headset 102 user can be listening to music, receiving a phone call, or privately chatting with another gamer while simultaneously listening to the gaming link conversation. In other example embodiments there could also be audio transmission (e.g. mic) from the headset to dongle and/or phone. Possibly even in parallel.

In many example embodiments, the audio streams 112, 114 are all LE Audio streams, and not Bluetooth classic streams.

Separate scheduling algorithms in both the first central device 104 (e.g. dongle initiator) and the second central device 110 (e.g. smartphone initiator) create two different schedules for transmitting and receiving audio packets to the peripheral device 102 (e.g. headset acceptor). These schedules allocate a number of timeslots for transmission of audio packets, including options for retransmissions. In LE Audio, the two audio streams 112, 114 are transmitted isochronously (ISO).

In some example embodiments, these schedules are repeated during each LE Audio defined ISO interval (or multiple ISO intervals for burst number larger than 1). Typical values of ISO interval for a phone 110 connection are 7.5 ms and 10 ms or multiples of these values. The gaming link uses a smaller value such as 5 ms in order to keep audio latency as low as possible.

Typically an end-to-end audio latency is a key metric for a gaming link. Audio latency should be as low as 20 ms or even below to have an acceptable gaming audio experience.

An important contributor to the audio latency is transport delay (i.e. a wireless transmission delay between transmitter and transceiver, excluding audio processing or audio filter group delays). The transport delay depends on a number of audio stream transmission scheduling parameters (e.g. ISO parameters as defined within the LE Audio standard, also see FIG. 6) such as: an ISO interval, which defines a time interval at which the schedule repeats itself); a number of subevents (NSE), which defines a number of subevents which will be scheduled in each ISO Interval; and a flush timeout, which defines how many consecutive ISO Intervals can be used to transmit a packet before it is discarded.

Figure 2:
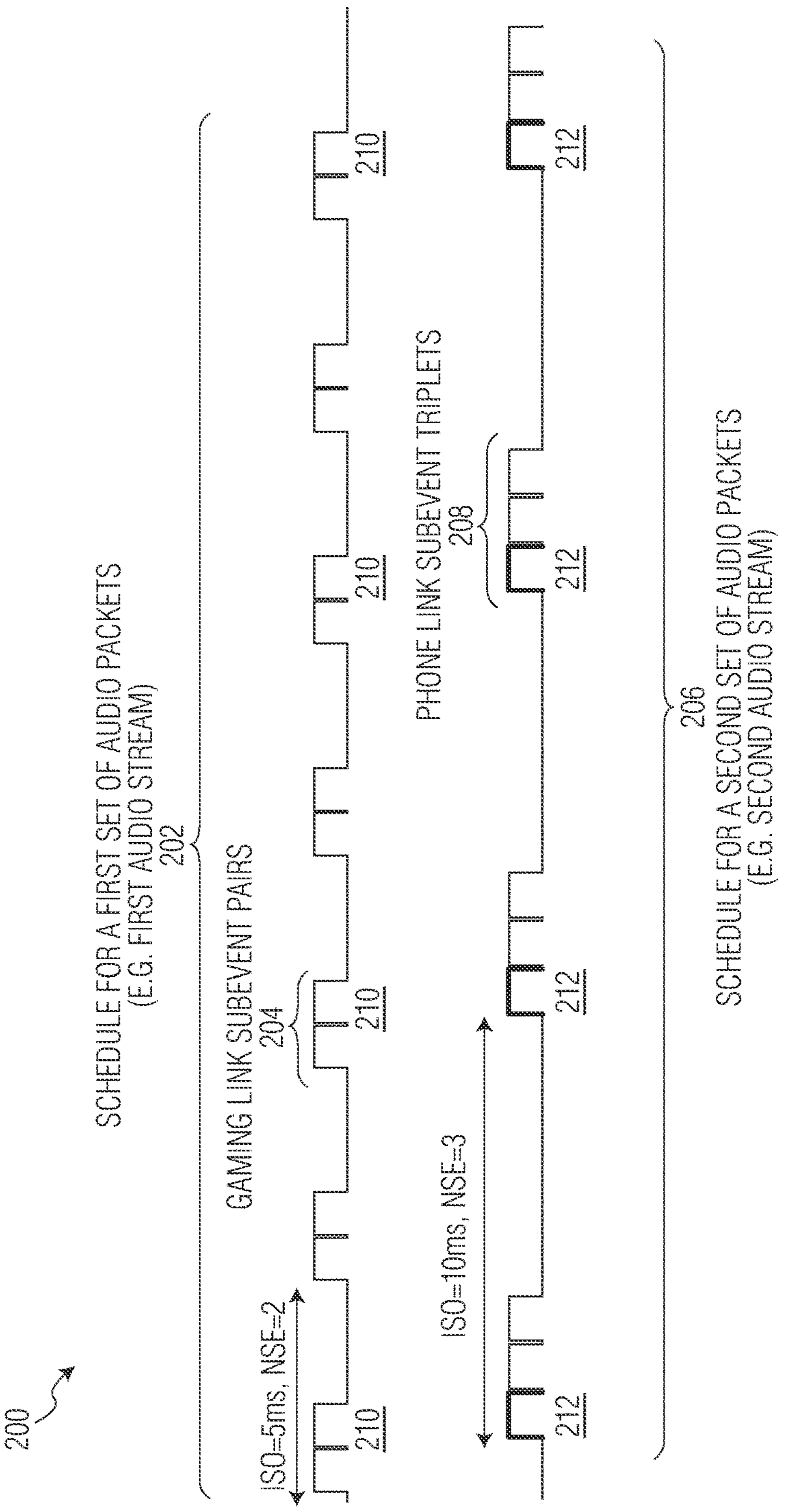
FIG. 2 represents a first example schedule of a first set of audio packets (e.g. first audio stream for a gaming link) over a first wireless link in parallel with a second set of audio packets (e.g. second audio stream for a phone link) over a second wireless link between the peripheral device and the first and second central devices.

FIG. 2 represents a first example schedule 200 of a first set of audio packets 202 (e.g. first audio stream for a gaming link) over a first wireless link in parallel with a second set of audio packets 206 (e.g. second audio stream for a phone link) over a second wireless link between the peripheral device 102 (e.g. headset) and the first and second central devices 104, 110.

The first example schedule 200 shows the timing of gaming link subevent pairs 204 and phone link subevent triplets 208 (including acknowledgements) within both the first audio stream 202 and the second audio stream 206 that result in sporadic collisions. For example, a repeated collision between gaming link subevents 210 and phone link subevents 212 is shown.

Often such collisions are by accident, since the timing purely depends on each of the central device 104, 110 (e.g. of the phone 110 and the dongle 106) clocks which are each independently derived from their own crystals. This also means that both schedules are expected to drift apart at a rate of the mismatch between the two crystals.

Having overlap between subevents means that the peripheral device 102 (e.g. headset) needs to choose which device (i.e. the phone 110 or the dongle 106) to communicate with during those colliding/overlapping subevents. The peripheral device 102 (e.g. headset) includes a priority encoder in a link controller for making this selection.

The central devices 104, 110 (e.g. of the phone 110 and the dongle 106) do not know there is a conflict. Only the peripheral device 102 (e.g. headset) knows there is a conflict. The other unchosen central device will not see an acknowledge from the peripheral device 102 (e.g. headset) and will then attempt to retransmit its audio packet.

In many gaming example embodiments, low latency is key. In such LE audio based gaming applications the LE audio radio's transmission scheduling ISO parameters (e.g. flush timeout and number of sub-events) are set to minimal values in order to optimize low latency, thereby sacrificing margin on link robustness resulting in more audio packet collisions.

In such gaming applications adding the second central device 110 (e.g. smartphone) connection is designed not to increase a number of dropped gaming link audio packets.

Therefore, the priority encoder in the headset 102 is configured so that the gaming link shall have a higher priority than the phone link during a scheduling conflict.

In some example embodiments, such sporadic collisions are generally acceptable, even if the gaming link always has a higher priority, as long as the phone link has sufficient options for retransmissions.

Figure 3:
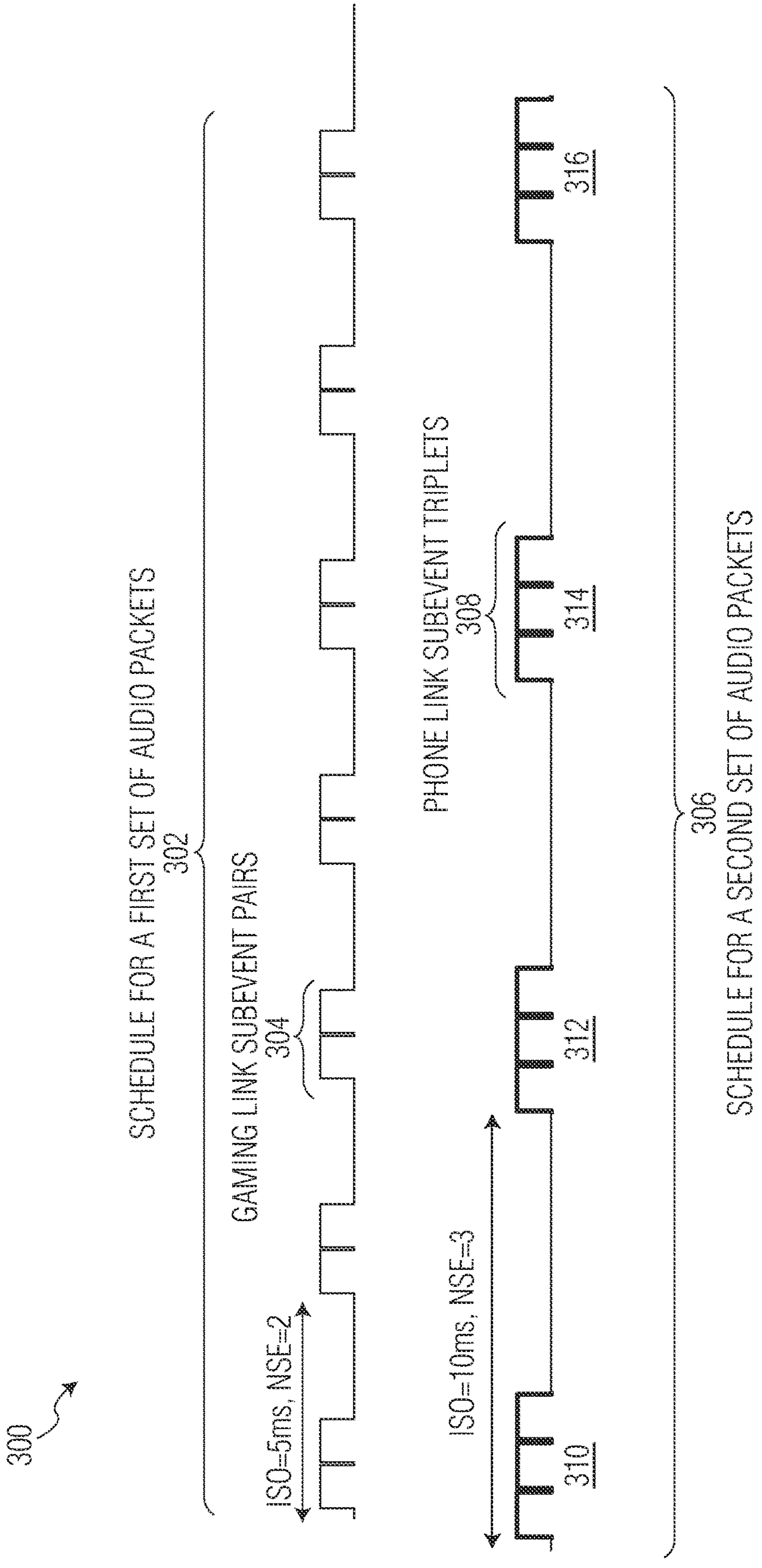
FIG. 3 represents a second example schedule of a first set of audio packets (e.g. first audio stream for a gaming link) over a first wireless link in parallel with a second set of audio packets (e.g. second audio stream for a phone link) over a second wireless link between the peripheral device and the first and second central devices.

FIG. 3 represents a second example schedule 300 of a first set of audio packets 302 (e.g. first audio stream for a gaming link) over a first wireless link in parallel with a second set of audio packets 306 (e.g. second audio stream for a phone link) over a second wireless link between the peripheral device 102 (e.g. headset) and the first and second central devices 104, 110.

The second example schedule 300 shows the timing of gaming link subevent pairs 304 and phone link subevent triplets 308 within both the first audio stream 302 and the second audio stream 306 that result in continuous collisions. Here for example, all of the gaming subevent pairs 304 subevents are colliding with all of the phone link subevent triplets 308 subevents 310, 312, 314, 316. This is not acceptable since the phone link does not have any retransmissions opportunities for an extended period of time.

These continuous collisions arise due to drift between the independent crystal clocks of the first central device and the second central device. Under perfect but unrealistic link conditions such continuous subevent overlaps are still not an issue, if the gaming link does not use all of its subevents to transmit the audio since the gaming link is "perfect" and no retransmissions are required. In such a "perfect" case, only the first two subevents of the phone link are colliding and the third subevent is still available for the phone 110 to retransmit its audio packets.

However, in reality there is a non-zero packet error rate for the gaming link, and in such cases, packet errors on the gaming link will lead to many dropped audio packets on the phone link.

These collisions/overlaps will disappear for a time and phone link retransmissions will be possible as soon as the two central device schedules have drifted apart and are not completely colliding anymore, however these collisions/overlaps will reappear and result in a noticeable disruption to the phone link. Also while a limited amount of dropped audio packets can still be concealed by audio processing techniques (e.g. the LE Audio standard includes a Packet Loss Concealment algorithm) this also has its limits and can lead to significant audio artifacts and if too many subsequent packets are missing, to audio mutes/blanking periods.

Figure 4:
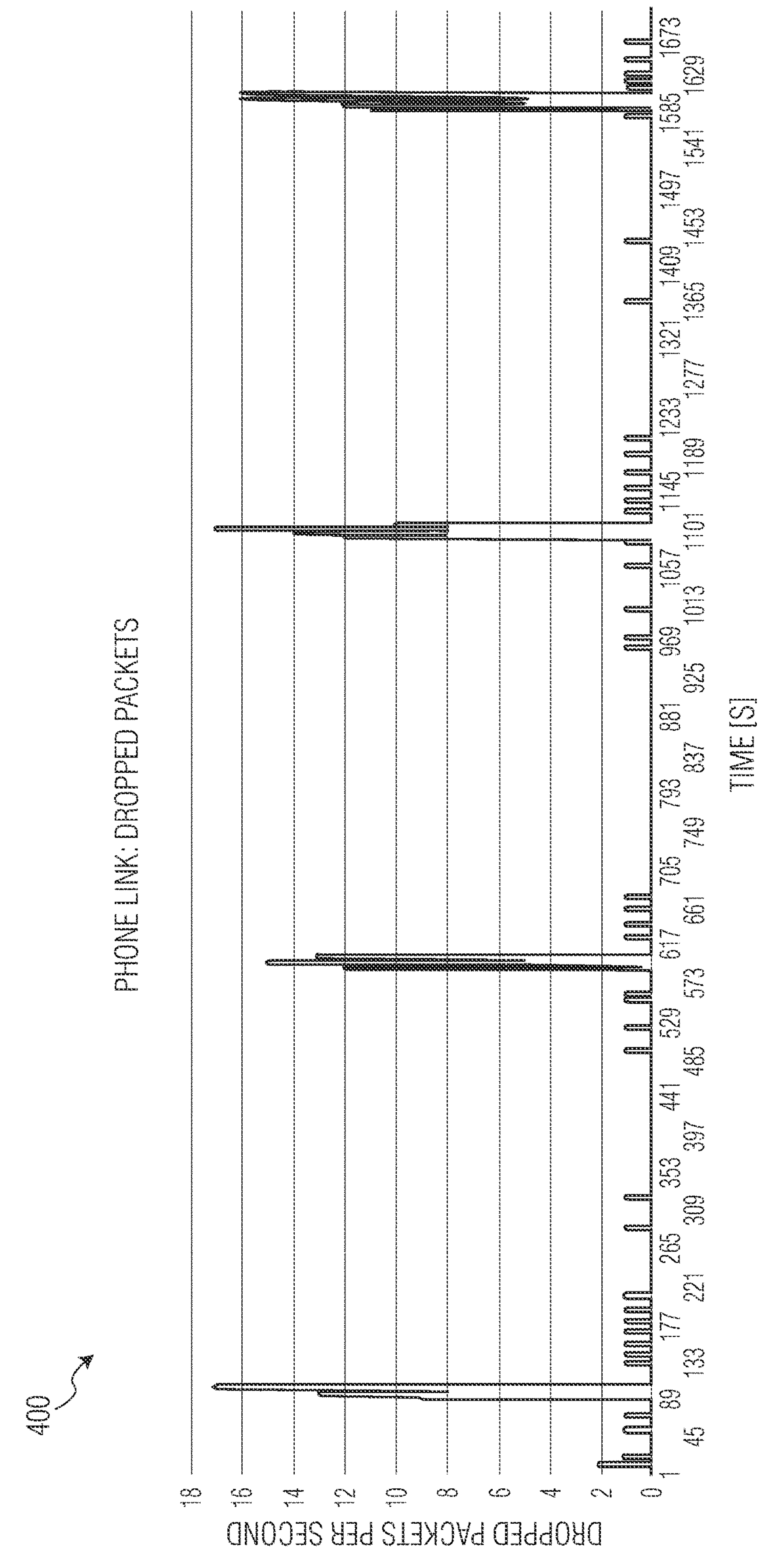
FIG. 4 represents an example recurrent pattern of phone link dropped packets due to continuous packet (i.e. subevent) collisions between the gaming link and the phone link.

FIG. 4 represents an example 400 recurrent pattern of phone link dropped packets due to continuous packet (i.e. subevent) collisions between the gaming link and the phone link. This problem will manifest itself at use case level by having a phone link which has good quality (meaning no audio drops) but every so many minutes the link quality drops significantly for a while.

The example 400 shows an expected amount of dropped packets per second (at the headset 102) in the phone link under following example conditions: a 1E-3 packet error rate of the gaming link; a 1E-3 packet error rate of the phone line; and a crystal mismatch of 10 PPM.

Now discussed are example embodiments of peripheral devices configured to improve communications robustness with a set of central devices. The peripheral device initiates dynamic switching of audio stream transmission scheduling parameters when more than one audio stream is received by the peripheral device. An intelligent transmission scheduler in the peripheral device 102 (e.g. headset acceptor) can detect/predict subevent collisions and overlap, and request that the central devices 104, 110 change their transmission scheduling parameters.

Figure 5:
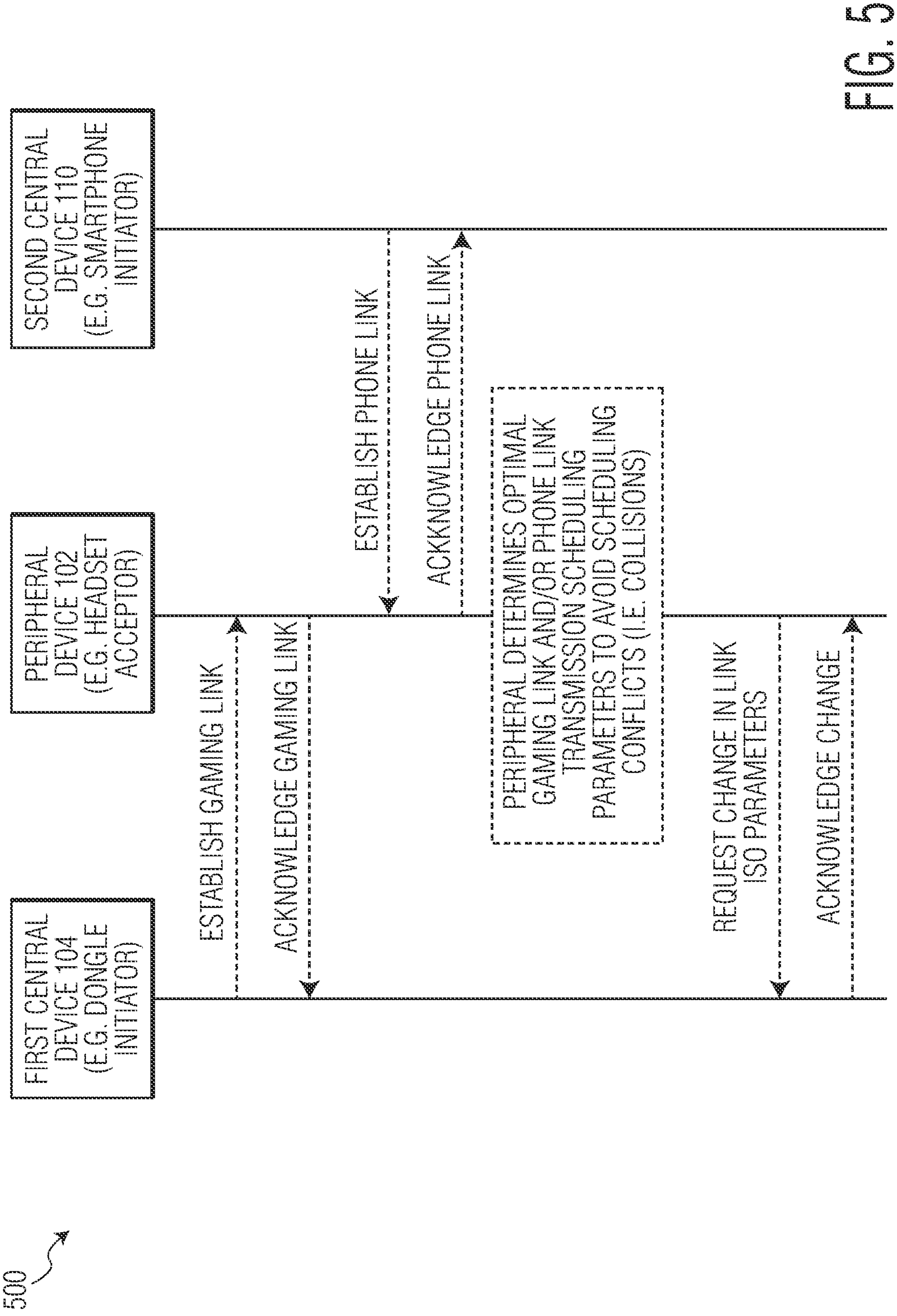
FIG. 5 represents an example of a protocol for the peripheral device to adjust a transmission scheduling parameters for both a first set of audio packets (e.g. first audio stream) received over a first wireless link from a first central device, and a second set of audio packets (e.g. second audio stream) received over a second wireless link from a second central device.

FIG. 5 represents an example of a protocol 500 for the peripheral device 102 to adjust a transmission scheduling parameters for both a first set of audio packets 112 (e.g. first audio stream) received over a first wireless link from a first central device 104, and a second set of audio packets 114 (e.g. second audio stream) received over a second wireless link from a second central device 110.

The peripheral device 102 (e.g. headset) is configured to predict possible audio packet collisions due to overlap between the subevents of the first set of audio packets and the second set of audio packets, and then direct at least one of the first central device and/or the second central device to adjust a transmission schedule of the first set of audio packets and/or the second set of audio packets.

Since the peripheral device 102 (i.e. headset) has more of the transmission scheduling parameters (e.g. ISO parameters) information than either of the central devices 104, 110 individually, the headset 102 looks at the transmission scheduling parameters of both links 112, 114 and asks one or more of the central devices 104, 110 to update the transmission scheduling parameters at least once to avoid audio packet collisions.

The peripheral device 102 does this proactively, before any audio packet collisions occur so as to prevent collisions before they occur by looking at these two overlapping TDMA schedules.

This can be thought of as "dynamic switching" of audio connection parameters of either or both the first link 112 (e.g. gaming link) and the first link 114 (e.g. phone link) by instructing the central devices 104, 110 to adjust their connection transmission scheduling parameters. In some example embodiments, the transmission scheduling parameters for only one of the audio streams is adjusted, with minimal impact on audio latency.

Dynamic switching can be thought of as consisting of three basic steps: Step 1: detection by only the peripheral device 102 (e.g. headset acceptor); Step 2: the peripheral device 102 request for the central devices 104, 110 to update the transmission scheduling parameters; and Step 3: the transmission scheduling parameters (e.g. PHY and other connection parameters) actually being updated by one or more of the central devices 104, 110.

In a model made to simulate the impact of collisions between gaming link and phone link schedules, the model predicts reduced robustness of the phone link depending on gaming link and phone link radio parameters (ISO interval, Number Of Subevents and Flush Timeout). The model assumes a higher priority for the gaming link than for the phone link in case of collisions in order not to weaken the gaming link when the phone link is enabled.

During operation because of clock drifts, the gaming link radio schedule can completely overlaps with the phone link schedule for a long period as was shown in FIG. 3 (i.e. every subevent in the phone link overlaps with at least on subevent in the gaming link).

If the ISO interval of the phone link increases also the payload length of the radio packets increases, making the packets longer. Once the phone link packets are long enough it will no longer be possible to have colliding schedules between gaming link and phone link for every packet in the phone link.

If the phone link ISO interval is a multiple of the ISO interval of the gaming link there will be significant impact on the phone link, otherwise not. Hence, a solution is to reconfigure the ISO interval of the gaming link when the phone sets up an audio link with the headset 102. At that time, the headset 102 knows if problems are to be expected or not. It can decide to dynamically switch between 5 ms and 7.5 ms ISO interval for the gaming link. In other example embodiments, the ISO interval of the phone link can be reconfigured in addition to or instead of the gaming link reconfiguration.

While this may have an impact on the transport delay of the gaming link of around 3 ms, some example designs can choose to keep latency the same all the time such that the dynamic switch can be implemented unnoticeable for the user or to go for lowest latency when possible and to hide to increase/decrease in latency when phone link is started/stopped and to mask the event (e.g. with a voice prompt).

While over time the clock drifts between the gaming link and phone link will eventually cause the schedules to collide from time to time, the phone link will no longer be blocked continuously.

In various example embodiments, the dynamic switching happens only once since the dynamic switching might cause a short audio interrupt. Alternatively, the central devices 104, 110 could also remember their transmission scheduling parameter setting from a last time they connected to a particular peripheral device 102. In other example embodiments, if the switch is done at the application layer, it will likely cause an audio interrupt. Addition to the LE standard of procedures for dynamic switching of ISO parameters can make such switches more seamless.

In some example embodiments, any audio interrupt during dynamic switching can be masked by playing a voice prompt (e.g. such as is done when ANC is enabled or disabled in a headset 102).

FIG. 6 represents example 600 sets of transmission schedule parameters (e.g. ISO parameters) 602, 604, 606 for the gaming link and/or the phone link.

For example, switching between 5 ms and 7.5 ms ISO interval for the gaming link works for phone link intervals of 10 ms, 20 ms and 22.5 ms but it doesn't for 15 ms phone link ISO interval: 15 ms is a multiple of 5 ms and 7.5 ms. In such a case, there are two options 610: first, use 10 ms gaming ISO interval; or second use 5 ms gaming interval and increase the flush timeout by 1 in the gaming link. The gaming link becomes more robust at the expense of 5 ms latency increase. A benefit of the second option over the first option is a slightly lower transport latency 608.

This increased robustness can be used to make the priority equal between gaming link and phone link when collisions occur: this reduces the link robustness of the gaming link, offsetting the effect of increased flush timeout but increases the link robustness of the phone link.

For phone link ISO interval of 30 ms there is likely to be no reduced link robustness issues anymore with reasonable setting for Number Of Subevents (≥3): the subevents in the phone link are not all the time colliding with the subevents of the gaming link and the phone link.

The above described example embodiments may be applied to wireless gaming headsets, wireless gaming earbuds, communications headset, wireless speakers, and similar audio enable devices using wireless communications.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A peripheral device, comprising:

a radio receiver configured to, receive a first set of audio packets transmitted over a first wireless link from a first central device, and receive a second set of audio packets transmitted over a second wireless link by a second central device; and a processor configured to predict a collision between the first set of audio packets and the second set of audio packets based on a set of transmission scheduling parameters and, based on the prediction of collision, request that the first central device adjust a transmission schedule of the first set of audio packets or request that the second central device adjust a transmission schedule of the second set of audio packets;

wherein the set of transmission scheduling parameters includes a first set of transmission scheduling parameters received from the first central device and a second set of transmission scheduling parameters received from the second central device;

wherein at least one of the first set of transmission scheduling parameters or the second set of transmission scheduling parameters is a set of Isochronous (ISO) parameters;

wherein the ISO parameters include an ISO interval defining a time interval between audio packet transmissions; and wherein the ISO parameters include a number of subevents scheduled within the ISO interval.

2. The device of claim 1:

wherein the first and second sets of audio packets are Bluetooth LE audio packets.

3. The device of claim 1:

wherein the first central device is configured to initially schedule when the first set of audio packets are transmitted over the first wireless link; and wherein the second central device is configured to initially schedule when the second set of audio packets are transmitted over the second wireless link.

4. The device of claim 1:

wherein the processor is further configured to request that the first central device adjust the transmission schedule of the first set of audio packets and request that the second central device adjust the transmission schedule of the second set of audio packets.

5. The device of claim 4:

wherein at least one of the first central device and the second central device is configured to update one or both of the sets of transmission scheduling parameters based on the request from the peripheral device.

6. The device of claim 1:

wherein the ISO parameters include a flush timeout defining a maximum number of consecutive ISO intervals for transmitting a particular audio packet before the particular audio packet is discarded.

7. The device of claim 1:

wherein the processor is a priority encoder or a link controller.

8. The device of claim 1:

wherein the first wireless link is a gaming link and the second wireless link is a phone link.

9. The device of claim 1:

wherein the processor is configured to predict the collision based on the first and second sets of transmission scheduling parameters before the first set of audio packets are first transmitted by the first central device.

10. The device of claim 9:

wherein the processor is further configured to predict the collision before the second set of audio packets are first transmitted by the second central device.

11. The device of claim 1:

wherein the peripheral device is a headset.

12. The device of claim 11:

wherein the first central device is a dongle.

13. The device of claim 12:

wherein the second central device is a smartphone.

14. The device of claim 1:

wherein the peripheral device is at least one of a wireless earbud and/or a wireless speaker.

* * * * *